United States Patent [19]
Stehlin

[11] 3,743,955
[45] July 3, 1973

[54] RADIATION HARDENING READ PREAMPLIFIER

[75] Inventor: Robert A. Stehlin, Richardson, Tex.

[73] Assignee: The United States of America as represented by the Secretary of the Air Force, Washington, D.C.

[22] Filed: July 13, 1971

[21] Appl. No.: 162,071

[52] U.S. Cl. .................................. 330/22, 330/30 D
[51] Int. Cl. .................................. H03f 3/68
[58] Field of Search .......................... 330/30 D, 22; 307/308

[56] References Cited

UNITED STATES PATENTS

| | | | |
|---|---|---|---|
| 3,597,649 | 8/1971 | Matarese | 330/30 D X |
| 3,628,059 | 12/1971 | Niu | 330/30 D X |
| 3,524,999 | 8/1970 | Fletcher et al. | 307/308 |
| 3,409,839 | 11/1968 | Crowe | 307/308 X |

*Primary Examiner*—Nathan Kaufman
*Attorney*—Harry A. Herbert, Jr. et al.

[57] ABSTRACT

A read pre-amplifier capable of operation in a radiation environment utilizing self compensation throughout to provide radiation hardness against the effects of photocurrents which are induced by gamma radiation.

1 Claim, 1 Drawing Figure

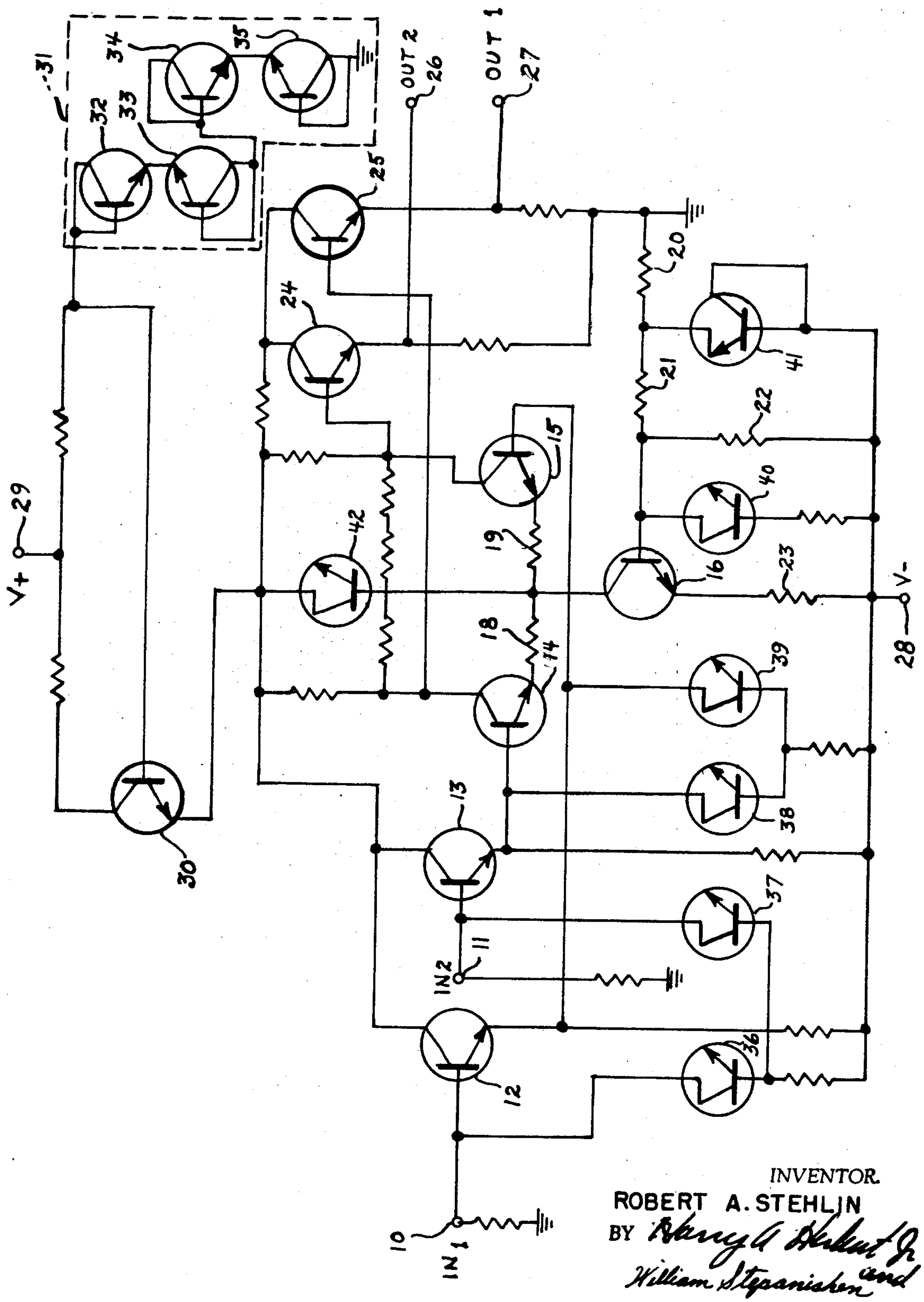
INVENTOR.
ROBERT A. STEHLIN
BY Harry A. Herbert Jr. and William Stepanishen
ATTORNEYS

RADIATION HARDENING READ PREAMPLIFIER

BACKGROUND OF THE INVENTION

When an electronic device utilizing semiconductors is operated in an environment which is subjected to radiation such as gamma rays, hole electron pairs are generated within the semiconductor material. These carriers move by diffusion and drift to and through the semiconductor junctions. The effect of these carriers passing through the semiconductor junction is to produce transient photocurrents. The current components which enter the base region are called the primary photocurrents. The major component of primary photocurrent is produced in the collector region and in the transition region of the collector-base junction. The emitter component of the primary photocurrent is, in general, substantially smaller than the major component of the primary photocurrent. The short diffusion length which is utlized in the emitter contributes to the smaller emitter component of the primary photocurrent.

The primary photocurrent which enters the base region produces an amplified component of current which is called the secondary photocurrent. The magnitude of the transient photocurrents increases with ionizing rate. For high radiation rates, the currents may be of sufficient magnitude in the circuit to produce error signals or render the circuit inoperative.

Prior art radiation hardened circuits were designed to minimize the effects of transient photocurrents by utilizing the devices having small junction areas. The lifetime of the collector junction may be minimized through the use of low resistivity material and gold doping. The adverse effects of ionizing radiation may also be minimized by using low impedance circuits and compensation techniques. These compensation techniques employ auxiliary junctions to counteract the effect of photocurrents generated within the circuits. Thus, two extra compensation diodes are included in the collector and base circuits respectively which generate photocurrents matching that of the collector base junction and provide a continuous path for the primary photocurrent. Assuming perfect matching, no base current is produced and the secondary photocurrent is suppressed.

SUMMARY OF THE INVENTION

The present invention provides a radiation hardened read pre-amplifier utilizing self compensation to cancel the effects of radiation-induced photocurrents. During operation in an radiation environment, semiconductor devices are utilized to produce photocurrents and thereby offset the effects of photocurrents which are produced within the read amplifier circuit.

It is an object of the invention, therefore, to provide an improved radiation hardened read pre-amplifier apparatus utilizing self compensating semiconductor circuits to cancel the effects of radiation induced photocurrents.

It is another object of the invention to provide an improved radiation hardened read amplifier preapparatus having the capability of operation in radiation environment.

These and other advantages, features and objects of the invention will become more apparent from the following description taken in connection with the illustrative embodiment in the accompanying drawing where the FIGURE is a schematic diagram of the radiation hardened read amplifier apparatus in accordance with this invention.

DESCRIPTION OF PREFERRED EMBODIMENT

Referring now to the FIGURE, there is shown a schematic diagram of the radiation hardened read preamplifier having first and second input terminals 10, 11 to receive input signals. The input signals which appear at the input terminals 10, 11 are applied to the bases of transistors 12, 13. The transistors 12, 13 are utilized as emitter followers to couple the input signals to the bases of transistors 14, 15. The differential amplifier which is comprised of transistors 14, 15 has their respective emitters connected through emitter resistors 18, 19 to a constant current source tran sistor 16. The bias current to transistors 14, 15 is supplied by transistor 16. The constant current source, transistor 16, appears as a high a-c or incremental impedance to the input signals which are applied at terminals 10, 11. The transistor 16 requires only a relatively small d-c voltage drop for operation and receives its bias current from the voltage divider formed by resistors 20, 21, 22 which sets the emitter voltage of transistor 16. Once the emitter voltage of transistor 16 is set at a given voltage level, the resistor 23 determines the value of constant current, $I_0$, that will flow through transistor 16. The outputs of the differential amplifier are taken from the collectors of transistors 14, 15 respectively and are applied to output transistors 24, 25. The transistors 24, 25 are operated in the emitter follower circuit configuration with the output signals appearing at output terminals 26, 27 respectively.

The negative supply voltage is applied at terminal 28 and the positive supply voltage is applied at terminal 29. The positive supply voltage is applied to the collectors of transistors 12,13,14,15,24 and 25, respectively through bias control transistor 30. The bias on transistor 30 is controlled by bias unit 31 during operation in a radiation environment. The bias unit 31 utilizes emitter base diodes (forward and reverse) to shunt any photocurrent from transistor 30. Transistors 32 and 34 are forward bias emitter-base junction and transistors 33 and 35 operated in emitter-base reverse breakdown mode. The bias unit acts as a 14 volt zener diode that is not affected by transient radiation. It was previously noted that semiconductor devices are subject to the effects of a radiation environment by producing photocurrents which have an adverse effect upon circuit operation. Therefore, some form of circuit compensation is required at all critical points in a circuit in order to operate in a radiation environment. In the present invention self compensation is employed to overcome the effects of a radiation utilizing the photocurrent generated in a compensating transistor collector to base junction to compensate the photocurrent generated in the circuit transistor. Input transistors 12, 13 have compensation bases of transistors 12, 13 to the negative supply voltage at terminal 28. It may be clearly seen that any increase in photocurrent in transistors 12, 13 will be cancelled by the resultant increase, also, in compensation transistors 36, 37. Therefore, this critical area of the read amplifier is unaffected by the effects of operation in an radiation environment. The transistors 14, 15 of the differential amplifier have compensation transistors 38, 39 connected between their respective bases to the negative supply voltage. Transistors 38, 39 operate to cancel the photocurrents which are induced in transistors 14, 15. During operation in a radiation environment, current source transistor 16 is protected from the effects of induced photocurrents by compensation transistors 40, 41 which are connected from the base of transistor 16 to the negative supply voltage. Further induced photocurrent compensation is provided to current source transistor 16 by means of transistor 42 which is connected between the positive supply voltage and the collector of transistor 16. Thus, it may be seen that, during operation in a radiation environment, the radiation hardened read pre-amplifier utilizes the present self compensation technique to overcome the adverse effects of radiation induced photocurrents.

Although the invention has been described with reference to a particular embodiment, it will be understood to those skilled in the art that the invention is capable of a variety of alternative embodiments within the spirit and scope of the appended claims.

I claim:

1. A radiation hardened pre-amplifier circuit comprising in combination:

a differential amplifier circuit having a first and second transistor, the emitters of said first and second transistors being connected by emitter resistors, a first and second input transistor to receive input signals respectively, said input signals being applied to the bases of said first and second transistors, the emitters of said first and second transistors being directly connected to the respective bases of said first and second transistors of said differential amplifier, a current source transistor having its collector connected between said emitter resistors of said first and second transistors of said differential amplifier, said current source transistor provide a constant current to said differential amplifier, a first and second output transistor connected to said differential amplifier, said first output transistor having its base connected to the collector of said first differential amplifier transistor, said second output transistor having its base connected to the collector of said second differential amplifier transistor, the emitters of said first and second output transistors being respectively connected to ground by emitter resistors, said first and second output transistors having output terminals connected to the emitters thereof, a negative supply voltage terminal to provide a negative bias voltage, the emitters of said first and second input transistors and said current source transistor being connected to said negative supply voltage terminal, a positive supply voltage terminal to provide a positive bias voltage, said positive supply voltage terminal being connected through a bias control transistor to the collectors of said first and second input transistors, said first and second differential amplifier transistors, said current source transistor, and said first and second output transistors, said bias control transistor having a photocurrent insensitive unit connected between its base and ground, and a plurality of photocurrent compensation devices to provide self compensation to said read pre-amplifier, said photocurrent compensation device comprising a transistor having a collector and base, said first and second input transistor having a compensation device connected in series between its base and said negative supply terminal respectively, said first and second differential amplifier transistor having a compensation device connected between said bases of said first and second differential amplifier transistors and said negative supply terminal respectively, said current source transistor having a compensation device connected in series between its collector and said positive supply voltage terminal, said current source transistor having its base connected to a voltage divider, said voltage divider comprising a first, second and third resistor, said base of said current source transistor being connected to the junction of said second and third resistor, the other end of said third resistor being connected to said negative supply voltage terminal, said first resistor being connected to the other end of said second resistor and ground, a compensation device connected between the junction of said first and second resistor and said negative supply voltage terminal.

* * * * *